United States Patent

[11] 3,619,512

[72] Inventors Alberto Ciaccia; Franco DeMarco, both of Milan, Italy

[21] Appl. No. 864,144

[22] Filed Oct. 6, 1969

[45] Patented Nov. 9, 1971

[73] Assignee Societa Italiana Telecommunicazioni Siemens S.p.A. Milan, Italy

[32] Priority Oct. 4, 1968

[33] Italy

[31] 22063 A/68

[54] DC SIGNALING SYSTEM UTILIZING MAGNETIC AMPLIFIERS

9 Claims, 9 Drawing Figs.

[52] U.S. Cl. 179/86, 179/16 AA, 330/8

[51] Int. Cl. H04m 1/26, H04q 9/00

[50] Field of Search 179/86, 16 A, 16 AA; 330/8; 307/314; 328/39.5

[56] References Cited

UNITED STATES PATENTS

| | | | |
|---|---|---|---|
| 3,426,969 | 2/1969 | Anderson | 330/8 X |
| 3,476,881 | 11/1969 | Van Hensenberg | 179/16 (.09) |
| 3,484,559 | 12/1969 | Rigby | 179/86 X |

*Primary Examiner*—Kathleen H. Claffy

*Assistant Examiner*—William A. Helvestine

*Attorney*—Karl F. Ross

ABSTRACT: A pair of magnetic amplifiers have their input windings serially connected to the receiving end of a transmission line for distinguishing between four different levels of direct current transmitted across that line, each amplifier also having an excitation winding energized by a pulse train and a biasing winding normally maintaining the amplifier core in saturation to minimize the magnetic coupling between the excitation winding and an output winding working through a transistor into an associated relay. The pulse amplitude and the winding turns are so chosen that both cores remain saturated with input currents below a first threshold whereby the two relays are unoperated, between the first and a second threshold, the first core is desaturated to energize one relay; between the second and a third threshold, both cores are desaturated with energization of both relays; and above the third but below a fourth threshold the first core is saturated with opposite polarity while the second core remains saturated to maintain only the other relay energized.

Alberto Ciaccia
Franco De Marco
INVENTORS.

BY

Karl F. Ross
Attorney

INVENTORS:
Alberto Ciaccia
Franco De Marco

BY Karl F. Ross
Attorney

Alberto Ciaccia
Franco De Marco
INVENTORS.

BY

Karl F. Ross
Attorney

INVENTORS:
Alberto Ciaccia
Franco De Marco

BY

Karl G. Ross
Attorney

DC SIGNALING SYSTEM UTILIZING MAGNETIC AMPLIFIERS

Our invention relates to a direct-current signaling system to be used for the communication of numerical data between telephone exchanges or similar installations.

In the communication of subscriber-identification codes, for example, each digit is conventionally identified by a sequence of dial pulses whose transmission is a rather time-consuming process. An alternate method, utilizing simultaneous transmission of different characteristic voltages, requires a relatively complex system with a sizable number of parallel wires.

The general object of our invention is to provide a data-transmission system which obviates the disadvantages of conventional arrangements and enables a rapid communication between two stations or terminals interconnected by a transmission line with a limited number of wires.

More particularly, our invention aims at facilitating the virtually instantaneous exchange of numerical date between two communicating stations with the aid of not more than a pair of wires, such as the talking conductors usually provided in telephone circuitry.

It is also an object of this invention to provide means in such a system for instantly and automatically acknowledging the receipt of digital information from an originating station by the transmission thereto of an answer-back signal from the receiving station.

A related object is to provide means at such receiving station for conditioning same to transmit numerical data to the opposite station immediately upon reception of digital information therefrom.

These objects are realized, pursuant to our invention, by the provision of a source of direct current at a first terminal in combination with selector means for transmitting currents of different magnitudes over one or two wires leading to a second terminal, the latter being equipped with detectors responsive to direct current of different levels and controlling respective output devices such as relays to operate same in different combinations depending on the magnitude of the transmitted current. At the second terminal, pursuant to another feature of our invention, a signaling device such as a relay responds to the operation of one or more of these output devices to transmit an answering current to the first terminal, the magnitude of this current being insufficient to trigger any of the detectors at the second terminal but being capable of actuating a monitoring device at the first terminal.

More specifically, in accordance with still another feature of our invention, the signal detectors at the receiving terminal include magnetic amplifiers with cores having a substantially rectangular hysteresis loop, these amplifiers being biased to different levels of saturation on one side of the hysteresis loop whereby an output winding on the core, which may be connected to an associated transistor for operating a control relay, is normally electromagnetically decoupled from an excitation winding on the core to which a train of current pulses is continuously applied. When an input winding on the core is traversed by a switching current of the proper magnitude, the bias is overcome so that the pulse train in the excitation winding inductively energizes the output winding in the rhythm of the applied pulses whereby the associated transistor in the load circuit of the amplifier becomes intermittently conductive. Owing to the different bias of two such magnetic amplifiers having their input windings connected (preferably in series) to the same transmission-line wire, one or the other of these amplifiers may be desaturated by a current whose magnitude falls in a first or a second range. If these ranges overlap, the magnitude of the current may be so selected as to cause simultaneous desaturation of both magnetic amplifiers with consequent operation of the two associated output relays or other loads. On the other hand, the input current may also have such a low (or high) magnitude that neither of these paired magnetic amplifiers responds, this current then serving to actuate another detector (such as the aforementioned monitoring device) in series therewith which may be a similarly constructed but differently biased magnetic amplifier.

In a particularly advantageous embodiment, the two terminals comprise substantially identical circuitry including duplicate signal detectors and duplicate selector and monitoring means at both ends of a two-way transmission line; a switchover relay at either terminal can then respond to operation of the monitoring device of the opposite terminal for conditioning its own terminal to transmit current signals in the reverse direction.

The above and other features of our invention will be described in greater detail hereinafter with reference to the accompanying drawing in which.

Figure 1:
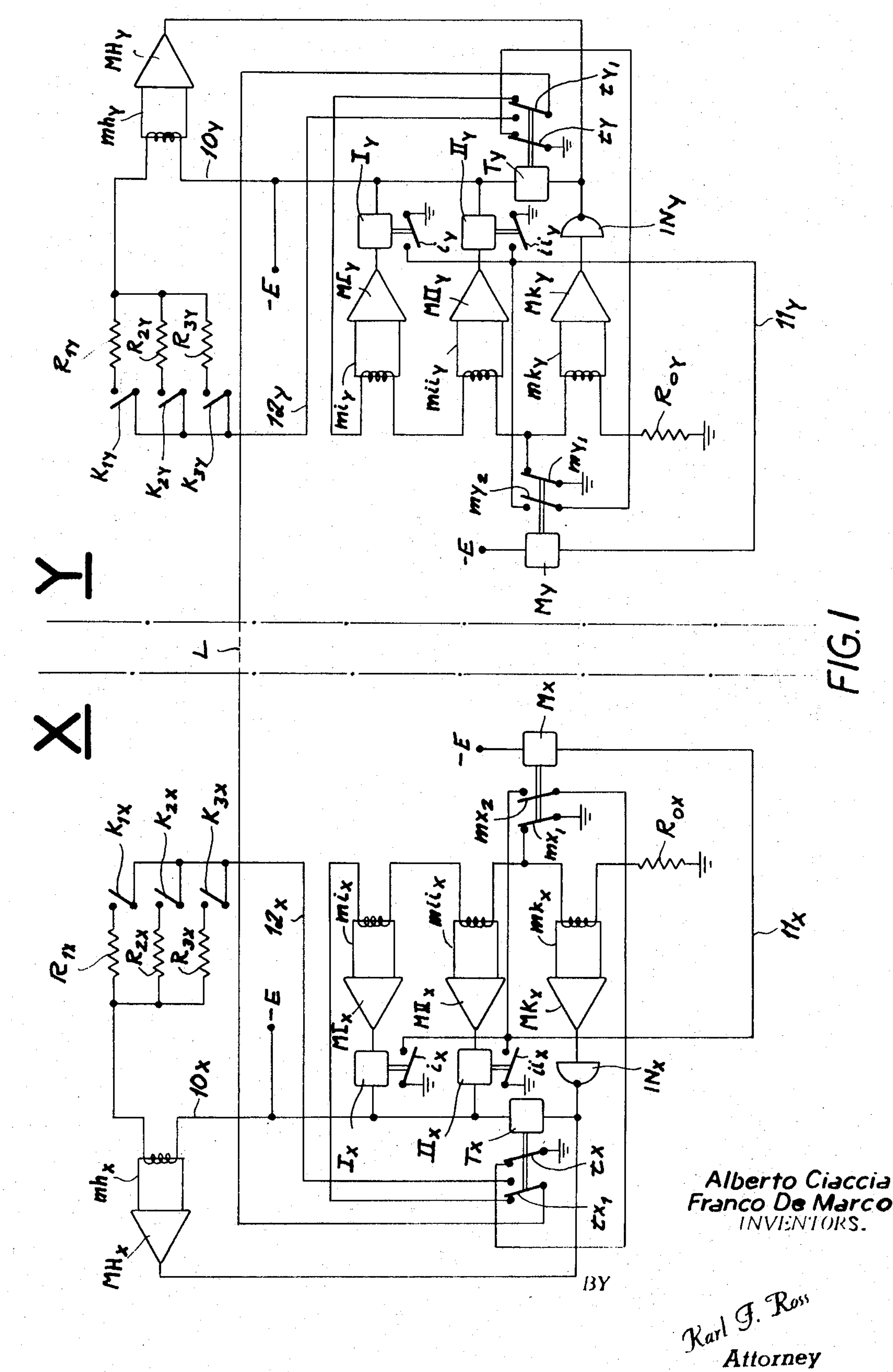
FIG. 1 is a circuit diagram of a simplified signaling system according to our invention.

The system shown in FIG. 1 comprises a first terminal or station X and a second terminal or station Y interconnected by a two-way transmission line L of which only one wire has been shown in this Figure. The two terminals are symmetrical, to the extent of the equipment here illustrated, and corresponding elements have been identified by subscripts *x* and *y*, respectively; thus, a detailed description of terminal X will be sufficient.

Each terminal includes a source of direct current, not shown, whose positive pole is assumed to be grounded and whose negative pole carries a voltage −E substantially identical for both stations. This negative potential is applied to a bus bar $10_x$ lying in the energizing circuit of three relays $I_x$, $II_x$ and $Tx$; a fourth relay $Mx$ has an energizing circuit $11_x$ closable by the make contacts of either of the two normally unoperated relays $I_x$, $II_x$.

The left-hand end of line wire L is connected, in the unoperated condition of relay $Tx$, via an armature $tx_1$ thereof to a lead $12_x$ to which any of three parallel resistors $R_{1x}$, $R_{2x}$, $R_{3x}$ of different magnitudes can be selectively connected with the aid of respective contacts $K_{1x}$, $K_{2x}$, $K_{3x}$. These contacts may be manually operable, e.g. by means of pushbuttons, or may be set by incoming signals from an associated station not shown. The common junction of resistors $R_{1x}$, $R_{2x}$, $R_{3x}$ is tied to conductor $10_x$ by way of a biasing winding on a core $mh_x$ of a magnetic amplifier $MH_x$ which, in a manner not shown in FIG. 1 but more fully described hereinafter, is energizable from source terminal −E to pass a holding current through relay $Tx$ if the same had been previously operated. Upon such operation, negative voltage on lead $12_x$ (due to closure of one or more contacts $K_{1x}$–$K_{3x}$) is transmitted to line wire L, this wire being grounded at station Y via armatures $ty_1$ and $my_1$ of the unoperated relays $T_y$ and $M_y$. Thus, a current of a magnitude depending on the selected series resistor or resistors $R_{1x}$–$R_{3x}$ flows across the line to communicate a desired numerical value to terminal Y.

With relay $Mx$ released, a magnetic amplifier $MK_x$ is activated by the flow of a signal current through a switching winding on its core $mk_x$ via a ballast resistor $R_{ox}$ and an armature $mx_1$ and back contact of relay $Mx$. As diagrammatically symbolized in FIG. 1 by an inverter $IN_x$ in the output of magnetic amplifier $MK_x$, the operation of this amplifier results in the deenergization of relay $Tx$ to condition the terminal X for the reception of similar signal currents from station Y via line wire L. Any such signal current traverses, via armatures $tx_1$ and $mx_1$ of the unoperated relays $Tx$ and $Mx$ respective switching windings on cores $mi_x$ and $mi_x$ of a pair of magnetic amplifiers $MI_x$, $MII_x$ serving as detectors for the received signals. As explained above, and as described in greater detail hereinafter, the magnitude of the incoming signal current may be such as to switch either or both of the two series-connected magnetic amplifiers $MI_x$, $MII_x$ to their activated state, with resultant energization of the respective discriminating relays $I_x$, $II_x$ in the output thereof. Either of these relays upon attracting its armature $i_x$ or $ii_x$ (apart from other armatures, not shown, to effect a desired switching operation), brings on the relay $Mx$ which locks via an armature $mx_2$ and in series with an armature $tx$ and back contact of relay $Tx$. The armature $mx_1$ of relay $Mx$ removes the direct ground from line wire L which thereupon remains grounded only through the ballast resistor $R_{ox}$. The resulting reduction of the line current deactivates the magnetic amplifiers $MI_x$ and/or $MII_x$ previously operated, along with the holding amplifier $MH_y$ whose switching winding is in series with the resistor or resistors $R_{1y}$–$R_{3y}$ which had been selectively inserted in the line circuit to signal the station X. Thus, amplifier $MH_y$ monitors the answer-back signal from station X constituted by the change in line current due to the operation of signal relay $Mx$. Deactivation of magnetic amplifier $MH_y$ releases the previously operated switching relay $Ty$ whereby both ends of line wire L are grounded in a circuit traceable from grounded armature $my_1$ of the unoperated relay $My$ via back contact and armature $ty_1$ or relay $Ty$, line L, armature $tx_1$ and back contact of relay $Tx$ to grounded resistor $R_{ox}$. The resulting cessation of line current deactivates the control amplifier $MK_x$ with resulting energization (via inverter $IN_x$) of relay $Tx$ whereby terminal X is conditioned to transmit to terminal Y a signal current of a magnitude dependent on a preselected resistor or combination of resistors $R_{1x}$–$R_{3x}$. The current now flowing to terminal Y activates, in the manner previously described for amplifiers $MI_x$ and $MII_x$, either or both of magnetic amplifiers $MI_y$, $MII_y$ whereby the corresponding relays $I_y$, $II_y$ are energized to register the received numerical signal.

The exchange of signals continues as long as one or more selector contacts $K_{1x}$–$K_{3x}$, $K_{1y}$–$K_{3y}$ are closed at both stations.

Figure 2:
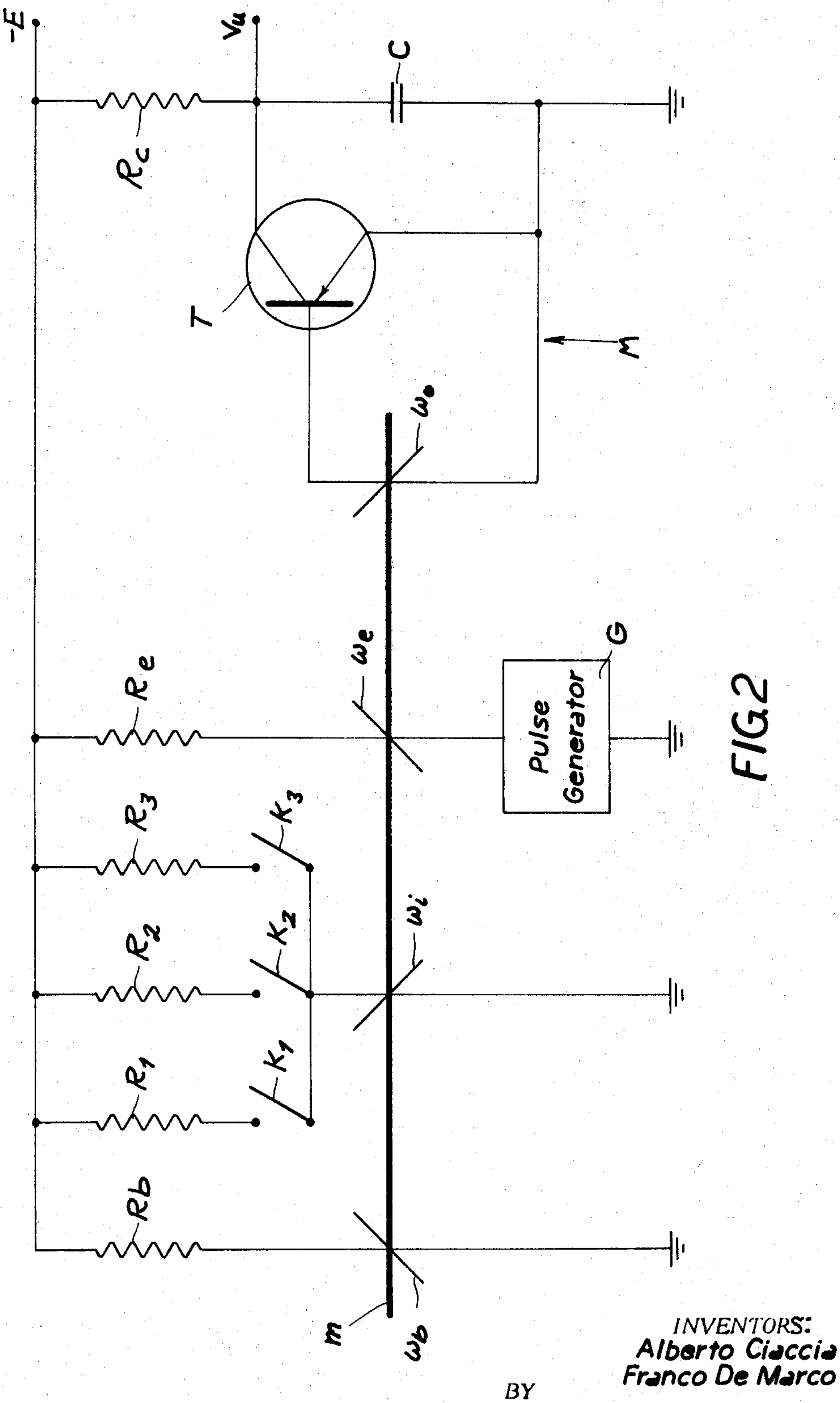
FIG. 2 is a more detailed diagram of part of the circuits of FIG. 1.

We shall now describe, with reference to FIG. 2, the mode of operation of an amplifier M representative of any of the several magnetic amplifiers illustrated in FIG. 1.

Amplifier M includes a magnetic stage, represented by a core $m$, and a transistor stage T in cascade therewith. Core $m$ carries four windings conventionally symbolized (cf. Proceedings of the IRE, May 1955, page 572) by slanting bars indicating by their parallel or nonparallel orientation the relative polarities of their currents. These windings include a biasing winding $w_b$ connected to operating voltage −E via a resistor $Rb$; an input winding $w_i$ selectively connectable to the same voltage via three parallel resistors $R_1$, $R_2$, $R_3$ in series with respective contacts $K_1$, $K_2$, $K_3$; an excitation winding $w_e$ connected between −E and ground in series with a resistor $Re$ and a pulse generator G which may be a mechanical or electronic interrupter; and an output winding $w_o$ connected between the base and the emitter of the transistor T shown to be of the PNP-type. The collector of the transistor, tied to an output terminal $V_u$ , is returned to negative potential −E through a resistor $Rc$; a condenser C is shunted across the collector and the grounded emitter of the transistor.

If the combined effect of the biasing current through winding $w_b$ and a switching current (if any) through input winding $w_i$ is such as to maintain the core $m$ in a state of desaturation, windings $w_i$ and $w_o$ are effectively coupled to each other whereby the pulses from generator G reappear in the input of transistor T to render the latter intermittently conductive. The resulting flow of collector current charges the condenser C which integrates these current pulses to provide a substantially continuous output voltage at terminal $V_u$.

With the relative orientation of windings $w_e$ and $w_b$ specifically illustrated in FIG. 2, the biasing current is in aiding relationship with the excitation pulses and may be so large as normally to carry the core $m$ to saturation; the opposing flow of a switching current in winding $w_i$ will then desaturate the core to produce an output. It is, however, also possible to make the biasing current of such magnitude and/or polarity that the core is normally desaturated, being saturated only upon the application of a suitable switching current to its input winding.

FIGS. 3A–3E diagrammatically illustrate several possibilities for selectively activating two magnetic amplifiers of the type shown in FIG. 2, such as the series-connected amplifiers $MI_x$ and $MII_x$ of FIG. 1, which are traversed by the same biasing current. These diagrams are based on the assumption that the biasing current through winding $w_b$ opposes the pulsating exciting current traversing the winding $w_i$ when one or more of the switches $K_1$–$K_3$ are closed. In each diagram, the upper graph plots the flux $\Phi'$ of the core of a first amplifier against the coercive force $H'$ thereof (measured in ampere-turns), the lower graph establishing the same relationship between the flux $\Phi''$ of a second magnetic amplifier and the corresponding coercive force $H''$. The hysteresis curves $h'$, $h''$ of the two amplifier cores are nearly rectangular and substantially identical. The biasing fields $H_b'$ and $H_b''$ are of different magnitudes, e.g. by reason of a difference in the number of turns of the respective biasing windings if both are traversed by the same current, whereby the zero points 0′ and 0″ of their fields are relatively offset (with reference to the common pulsating field $H_e$ generated by their excitation windings) to an extent substantially corresponding to half the width of the hysteresis loop.

Figures 3A, 3B, 3C:
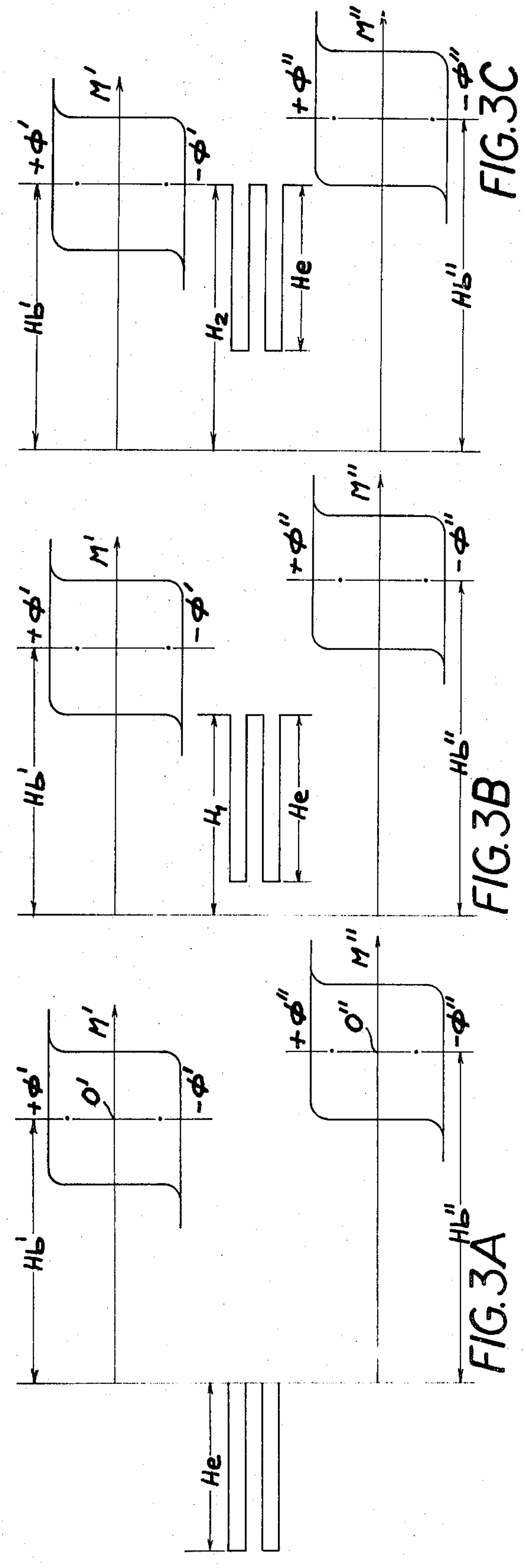
FIGS. 3A, 3B, 3C, 3D and 3E are sets of graphs serving to explain the principles of operation of the signal detectors of our invention.
Figures 3D, 3E:
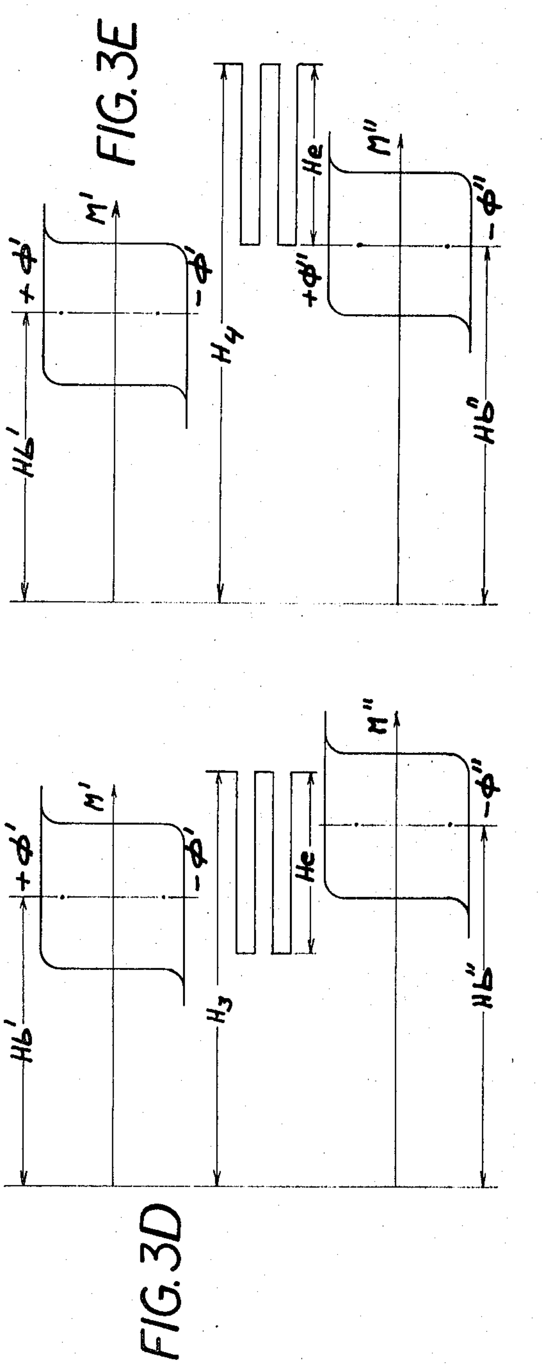

In FIG. 3A, where the input windings $w_i$ (FIG. 2) of the two amplifiers are deenergized, the pulses $H_e$ are located in the region of negative saturation of both amplifier cores; thus, their excitation and output windings are effectively decoupled so that substantially no current pulses are induced in their load circuits. In FIGS. 3B–3E a common switching field $H_1$–$H_4$, due to the energization of their input windings, has been superimposed upon the biasing and excitation fields already present. In FIG. 3B the field $H_1$ is insufficient to cancel the biasing fields $H_b'$ and $H_b''$; hence, both magnetic amplifiers remain deactivated even though a switching current traverses their input windings. In FIG. 3C the field $H_2$ has been increased to equal substantially the biasing field $H_b'$, being thus above the threshold of activation of the first amplifier but still insufficient to activate the second one. FIG. 3D shows a field force $H_3$ sufficient to surpass both thresholds, with the excitation field $H_e$ overlapping both hysteresis loops whereby the two magnetic amplifiers are simultaneously activated. FIG. 3E, finally, shows a switching field $H_4$ of such magnitude as to drive the excitation field $H_e$ past the desaturation range of the first amplifier while maintaining the second amplifier in its activated condition. There is also the possibility, not separately illustrated, of further increasing the input current so that both amplifier cores are driven to positive saturation.

Figure 4A:
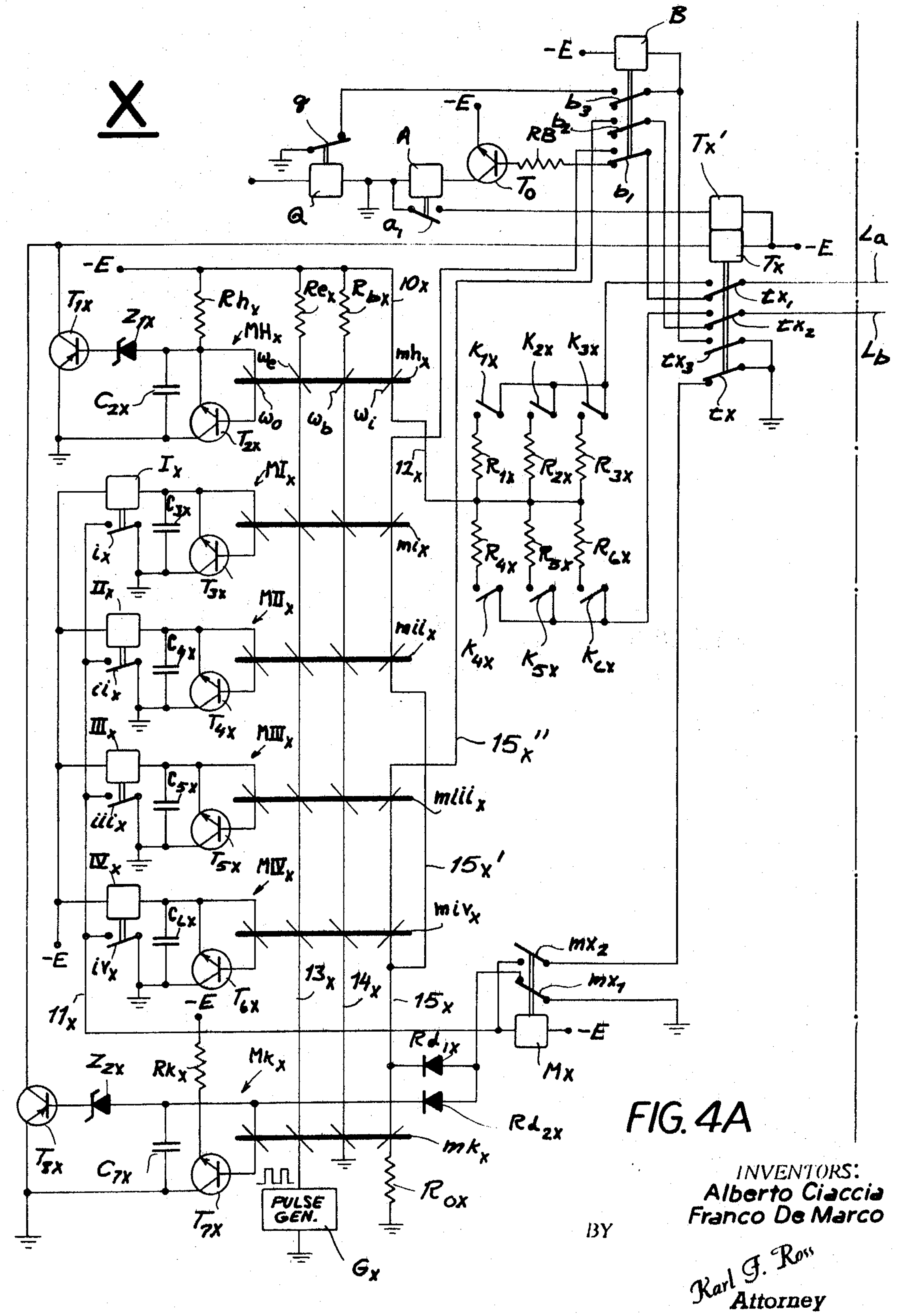
FIGS. 4A and 4B, when placed side by side, represent a more elaborate signaling system of the type illustrated in FIG. 1.
Figure 4B:
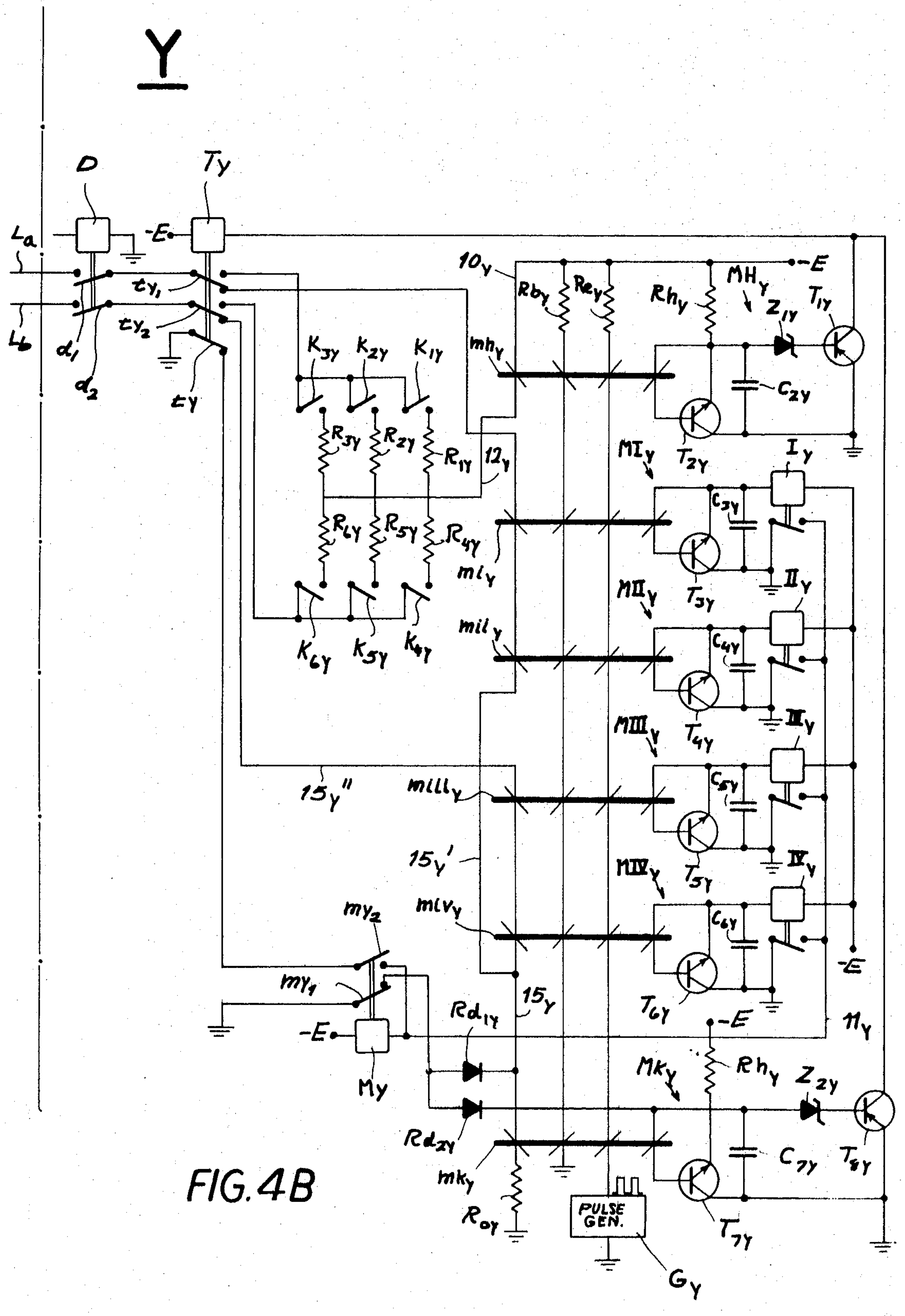

In FIGS. 4A and 4B we have shown the two terminals X and Y in greater detail. A major difference as compared with FIG. 1 is the provision, at terminal X, of three additional relays A, B and Q as well as a second winding $Tx'$ for relay $Tx$, this winding being energizable via an armature $a_1$ and front contact of relay A which in turn is connected to operating potential −E through a transistor $T_o$ of NPN-type. Also, a pair of armatures $d_1$, $d_2$ of a relay D normally interrupt a pair of wires $L_a$ and $L_b$ forming part of the transmission line interconnecting the two stations; these wires may also serve as the talking conductors of the line. Relay D is energizable, over circuits not shown, to initiate the exchange of messages between the two stations X and Y.

Furthermore, the two paired signal-detecting amplifiers $MI_x$ and $MII_x$ of station X as well as $MI_y$ and $MII_y$ of station Y, served by the line wire $L_a$, have been supplemented by two further pairs of magnetic amplifiers $MIII_x$, $MIV_x$ at station X and $MIII_y$, $MIV_y$ at station Y, these amplifiers being served by the line wire $L_b$. Amplifier $MH_x$ is seen to comprise, in cascade with its magnetic stage represented by core $mh_x$, a two-stage transistor section including a PNP-transistor $T_{1x}$ with its output circuit in series with the main winding of relay $Tx$ and an NPN-transistor $T_{2x}$ with its input circuit connected across the winding $w_o$ of core $mh_x$. Transistor $T_{2x}$, whose collector is grounded (as is the emitter of transistor $T_{1x}$) has its emitter connected to potential −E through a resistor $Rh_x$ and to the base of transistor $T_{1x}$ through a Zener diode $Z_{1x}$; the emitter and collector of transistor $T_{2x}$ are abridged by a smoothing capacitor $C_{2x}$. Amplifier $MK_x$ is of similar construction, including an NPN-transistor $T_{7x}$ with input connections across the output winding of core $mk_x$, a smoothing condenser $C_{7x}$, a resistor $Rk_x$ inserted between its emitter and source terminal −E, and a Zener diode $Z_{2x}$ interposed between this emitter and the base of a PNP-transistor $T_{8x}$ whose emitter/collector circuits are connected in parallel with those of transistor $T_{1x}$ through the main winding of relay Tx to potential −E. Analogous circuitry constitutes the corresponding amplifiers $MH_y$ and $Mk_y$ of station Y.

Line wire $L_b$ is selectively connectable to the input lead $\mathbf{12}_x$ of amplifier $MH_x$ via respective contacts $K_{4x}$, $K_{5x}$, $K_{6x}$ in series with resistors $R_{4x}$, $R_{5x}$, $R_{6x}$ by way of a further armature $tx_2$ and front contact of relay $T_x$; wire $L_a$ is connectable to the same lead, as in FIG. 1, via armature $tx_1$ and selector contacts $K_{1x}$–$K_{3x}$ as well as associated resistors $R_{1x}$–$R_{3x}$.

The excitation windings $w_e$ of all magnetic amplifiers of station X are connected in series between negative bus bar $\mathbf{10}_x$ and pulse generator $G_x$ through a conductor $\mathbf{13}_x$ via a common resistor $Re_x$; another common conductor $\mathbf{14}_x$ serially interconnects all the biasing windings $w_b$ of these amplifiers along with a common resistor $R_b$ between bus bar $\mathbf{10}_x$ and ground. The input winding of amplifier $MK_x$ is connected, in series with ballast resistor $R_{ox}$, between ground and a conductor $\mathbf{15}_x$ from which a first branch $\mathbf{15}_x'$ extends through the input windings of cores $mi_x$, $mii_x$, a front contact and armature $b_1$ of relay B, and a back contact and armature $tx_1$ of relay Tx to line wire $L_a$; a second branch $\mathbf{15}_x''$ leads through the input windings of cores $miii_x$ and $miv_x$ via a front contact and armature $b_2$ of relay $B_1$ and a back contact and armature $tx_2$ of relay Tx to line wire $L_b$. In the unoperated condition of relay Mx, its armature $mx_1$ grounds the conductor $\mathbf{15}_x$ directly through a rectifier $Rd_{1x}$, thus short-circuiting the ballast resistor $R_{ox}$, and the emitter of transistor $T_{7x}$ through another rectifier $Rd_{2x}$.

The base of cut-in transistor $T_o$ is normally connected through a resistor RB and the armature $b_1$ of the deenergized relay B as well as armature $tx_1$ of the equally unoperated relay Tx to line wire $L_a$. Upon operation of relay D to establish the connection between stations X and Y, transistor $T_o$ becomes conductive through the grounding of its base via armature $my_1$, diode $Rd_{1y}$, branch conductor $\mathbf{15}_y'$, back contact and armature $ty_1$ of relay Ty, armature $d_1$ of relay D, line wire $L_a$, armatures $tx_1$ and $b_1$ of relays Tx and B, and resistor RB. This energizes the relay A which attracts its armature $a_1$, thereby operating the relay Tx which breaks the input circuit of transistor $T_o$ but energizes the relay B at armature $tx_3$; relay B, via its armature $b_3$, locks to ground on the break contact $g$ of relay Q which is not operated until the connection is to be terminated; relay A is released at the same time.

The system is now conditioned for the transmission of numerical data to station Y in accordance with the position of the several selector switches $K_{1x}$–$K_{6x}$, one or more of which have been closed preparatorily to the operation of relay D. The magnitudes of the associated resistors $R_{1x}$–$R_{6x}$ are so chosen that the line currents flowing from left to right in wires $L_a$ and $L_b$ will be sufficient to activate, i.e. desaturate, the discriminating amplifiers of station Y in the manner indicated in the following Table:

Table A

| | | $MI_y$ | $MII_y$ | $MIII_y$ | $MIV_y$ |
|---|---|---|---|---|---|
| $L_a$ | $K_{1x}$ | + | | | |
| | $K_{2x}$ | | + | | |
| | $K_{3x}$ | + | | + | |
| | $K_{4x}$ | | | + | |
| $L_b$ | $K_{5x}$ | | | | + |
| | $K_{6x}$ | | | + | + |

Naturally, the same relationship exists for the opposite direction of current flow between the contacts of station Y and the magnetic amplifiers of station X.

The following code may be used for the transmission of the digits from 1 through 0 by the selective energization of the magnetic amplifiers:

Table B

| | $MI_y$ | $MII_y$ | $MIII_y$ | $MIV_y$ |
|---|---|---|---|---|
| 1 | + | | | |
| 2 | | + | | |
| 3 | + | + | | |
| 4 | | | + | |
| 5 | + | | + | |
| 6 | | + | + | |
| 7 | | | | + |
| 8 | + | | | + |
| 9 | | + | | + |
| 0 | | | + | + |

Let us assume that it is desired to transmit the numeral 5 as the first digit of the identification number of a called exchange or subscriber. This requires, in accordance with the foregoing tables, the preliminary closure of contacts $K_{1x}$ and $K_{4x}$ to activate the magnetic amplifiers $MI_y$ and $MIII_y$. The closure of contact $K_{1x}$ establishes a readily traceable current path from −E on bus bar $\mathbf{10}_x$ to ground on armature $my_1$ by way of branch conductor $\mathbf{15}_y'$ traversing the input windings of cores $mi_y$ and $mii_y$. The concurrent closure of contact $K_{4x}$ establishes a similar path through branch conductor $\mathbf{15}_y''$ traversing the input windings of cores $miii_y$ and $miv_y$. Magnetic amplifiers $MI_y$ and $MIII_y$ respond by energizing their respective output relays $I_y$ and $III_y$ whereby, again over contacts not shown, the numerical signal "5" is transmitted to an evaluation circuit; the current flowing through lead $\mathbf{12}_x$ energizes the input winding $w_i$ of core $mh_x$ which, prior to such energization, had been in a desaturated state (its excitation and biasing windings $w_e$ and $w_b$ being in mutually opposing relationship) so that transistor $T_{2x}$ was conductive and transistor $T_{1x}$ was blocked. With transistor $T_{2x}$ now cut off, transistor $T_{1x}$ conducts and passes a holding current through the main winding of relay Tx.

Via their illustrated armatures and front contacts, relays $I_y$ and $III_y$ energize the relay My to open the short circuit heretofore existing across resistor $R_{oy}$. Relay My locks over its front contact and armature $my_2$ in series with a back contact and armature $ty$ of relay Ty. Magnetic amplifiers $MI_y$ and $MIII_y$ resaturate but the reduced current flow in conductor $\mathbf{15}_y$ is sufficient to activate the magnetic amplifier $MK_y$ with resulting unblocking of transistor $T_{7y}$ whereby blocking potential (ground) is applied to the base of transistor $T_{8y}$ (which represents the inverter INy of FIG. 1) to replace the ground removed therefrom by the operation of relay My. At the same time, the magnetic amplifier $MH_x$ at the opposite terminal, deprived of a portion of its input current, is again desaturated to energize the transistor $T_{2x}$ and to reblock the transistor $T_{1x}$ whereby relay Tx releases. This constitutes the transmission and reception of an answer-back signal from station Y to station X. The release of relay Tx reconnects ground (via resistor $R_{ox}$) to the left-hand terminations of wires $L_a$ and $L_b$ so that the current flow through the input winding of core $mk_y$ ceases completely; transistor $T_{7y}$ is thereby cut off and transistor $T_{8y}$ is cut in to operate the relay Ty, thereby completely reversing the initial condition established upon the energization of relay A.

Thus, the system is now ready to transmit numerical data from station Y to station X, in conformity with the current magnitudes selected by the prior closure of one or more of contacts $K_{1y}$–$K_{6y}$. As described in connection with FIG. 1, this reverse transmission of numerical information can be followed by a further transmission from station X to station Y, such as a second digit of a call number if the setting of contacts $K_{1x}$–$K_{6x}$ is changed during the reception of the answering current.

We claim:

1. A signaling system for the transmission of numerical data between a first and a second terminal, comprising:

a transmission line with at least one wire extending between said terminals;

a source of direct current at said first terminal provided with selector means for transmitting currents of different magnitude over said wire;

a plurality of different signal detectors connected to said wire at said second terminal, said detectors including a first detector responsive to current magnitudes in a relatively low first range and a second detector responsive to current magnitudes of a relatively high second range overlapping said first range, said selector means being operable to transmit a first signal current of a magnitude between the lower limits of said ranges to trigger only said first detector, a second signal current of a magnitude within the region of overlap of said ranges to trigger said first and second detectors, and a third signal current of a magnitude between the upper limits of said ranges to trigger only said second detector;

and a plurality of output devices at said second terminal respectively controlled by said detectors for operating in different combinations depending on the current magnitudes established by said selector means.

2. A system as defined in claim 1, further comprising direct-current signaling means at said second terminal controlled by said output devices for transmitting across said wire an answering current of a magnitude insufficient to trigger said detectors, and monitoring means at said first terminal connected to said wire for detecting said answering current.

3. A system as defined in claim 1 wherein said detectors include magnetic amplifiers each with a core normally biased to saturation on one side of a substantially rectangular hysteresis loop, an input winding on said core connected to said wire, an excitation winding on said core and an output winding on said core substantially decoupled from said excitation winding in the saturated state of the core, said detectors being further provided with a generator of a continuous train of current pulses connected to the excitation windings of said magnetic amplifiers, the core of said first detector being desaturable by current magnitudes in said first range and saturable with opposite polarity by current magnitudes above said first range, the core of said second detector being desaturable by current magnitudes above said second range, desaturation of either core coupling the associated input and output windings for energizing the respective output winding in the rhythm of said current pulses.

4. A system as defined in claim 3 wherein said detectors further include respective transistors connected across said output windings and a pulse-integrating network in the output of each transistor.

5. A system as defined in claim 3, further comprising direct-current signaling means at said second terminal controlled by said output devices for transmitting across said wire an answering current of a magnitude insufficient to desaturate the core of either magnetic amplifier, and monitoring means at said first terminal connected to said wire for detecting said answering current.

6. A system as defined in claim 5 wherein said terminals are substantial duplicated of each other and are each provided with a source of direct current, selector means, signal detectors, signaling means and monitoring means, further comprising switchover means at each terminal responsive to operation of the monitoring means at the opposite terminal for conditioning the respective terminal to transmit current signals in the reverse direction across said wire.

7. A system as defined in claim 6 wherein said transmission line includes another wire, each of said terminals being provided with third and fourth detectors substantially identical with said first and second detectors and connected to said other wire for selective triggering by current transmitted from the opposite terminal under the control of said selector means thereat.

8. A system as defined in claim 7 wherein said selector means comprises a bus bar at each terminal connected to said source, a first set of resistors with contacts for individually connecting same between said bus bar and said one wire, and a second set of resistors with contacts for individually connecting same between said bus bar and said other wire, said monitoring means including a further magnetic amplifier with an input winding connected in series with said bus bar for energization by currents traversing either of said wires.

9. A system as defined in claim 8 wherein the input windings of said first and second detectors are serially connected to said one wire via a first branch conductor and the input windings of said third and fourth detectors are serially connected to said other wire via a second branch conductor, said switchover means including an additional magnetic amplifier with an input winding connected to both said branch conductors in parallel for energization by currents traversing either of said wires.

* * * * *